United States Patent
Taira et al.

(12)

(10) Patent No.: US 9,958,623 B1
(45) Date of Patent: May 1, 2018

(54) TOOL FOR PLUG, PLUG AND CABLE WITH PLUG

(71) Applicant: SEIKOH GIKEN CO., LTD., Chiba (JP)

(72) Inventors: Junji Taira, Chiba (JP); Masayuki Jibiki, Chiba (JP); Yohei Takaishi, Chiba (JP); Norimasa Arai, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 0 days. days.

(21) Appl. No.: 15/637,371

(22) Filed: Jun. 29, 2017

(51) Int. Cl.
  *G02B 6/38* (2006.01)
  *G02B 6/42* (2006.01)

(52) U.S. Cl.
  CPC ......... *G02B 6/3898* (2013.01); *G02B 6/4261* (2013.01)

(58) Field of Classification Search
  None
  See application file for complete search history.

(56) References Cited

U.S. PATENT DOCUMENTS

| | | | |
|---|---|---|---|
| 7,297,013 B2* | 11/2007 | Caveney | H01R 13/6272 439/352 |
| 2005/0117855 A1* | 6/2005 | Yang | G02B 6/4292 385/92 |
| 2007/0011857 A1* | 1/2007 | Francis | H01R 43/26 29/426.5 |
| 2009/0188106 A1* | 7/2009 | Wang | G02B 6/3897 29/764 |

FOREIGN PATENT DOCUMENTS

| | | |
|---|---|---|
| JP | 2002-350677 A | 12/2002 |
| JP | 2005-17602 A | 1/2005 |

* cited by examiner

*Primary Examiner* — Mike Stahl
(74) *Attorney, Agent, or Firm* — Kenealy Vaidya LLP

(57) ABSTRACT

A plug attached to a terminal part of a cable includes a plug main body engaged to an adaptor, a slider and a tool. The tool includes an insertion portion having a tapered part and an engaging projection and an operation part. When the operation part is pulled with a second surface of the insertion portion inserted in a slot being disposed in parallel with an extraction direction, the engaging projection is engaged with an engaging portion of the slider, the slider is moved integrally with the tool and the plug main body is pulled out from the adaptor. When the operation part is pulled with an inclined surface of the tapered part being disposed in parallel with the extraction direction, the engaging projection is released from an engaging state with the engaging portion and the tool is detached from the slider.

9 Claims, 12 Drawing Sheets

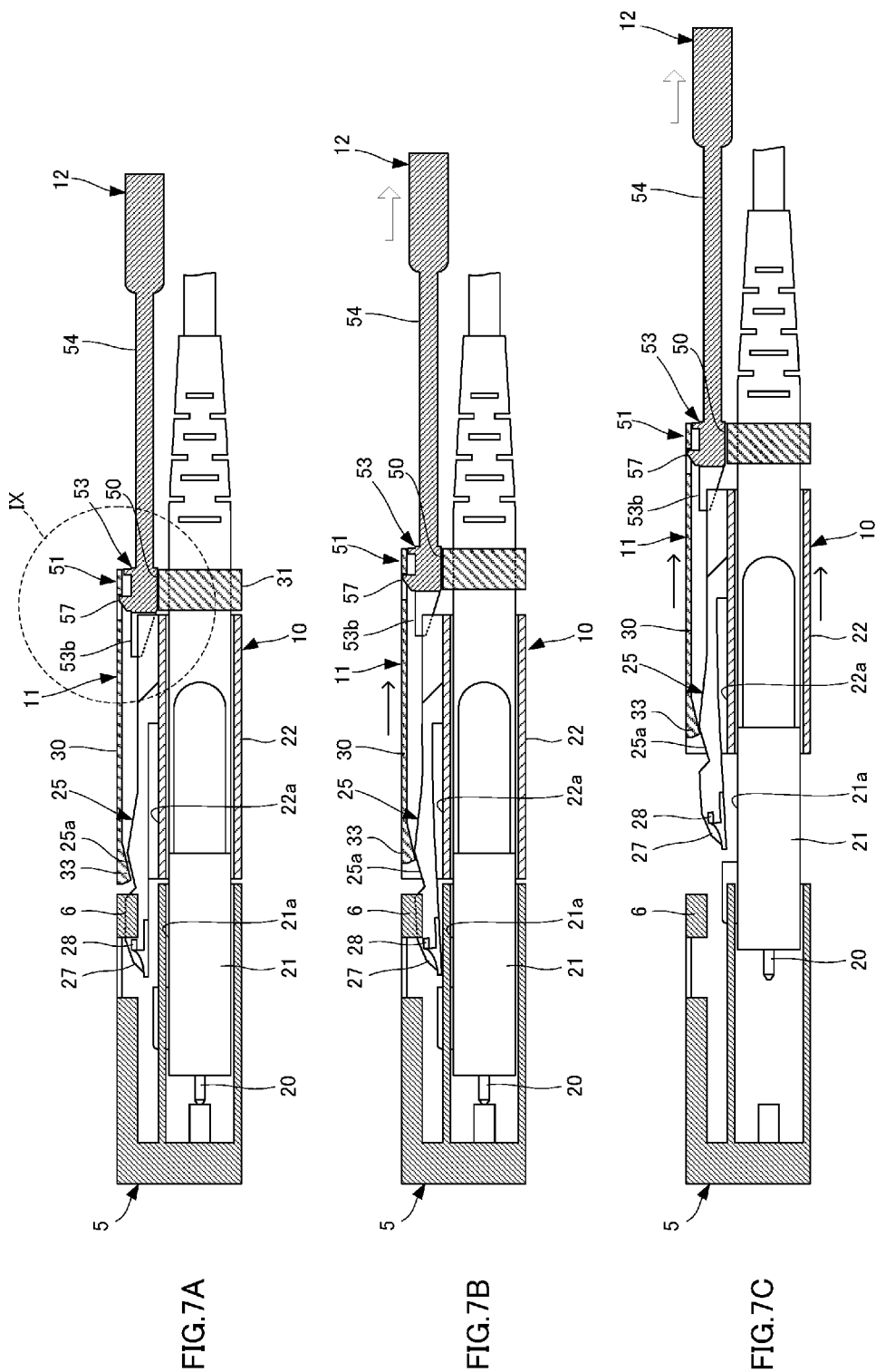

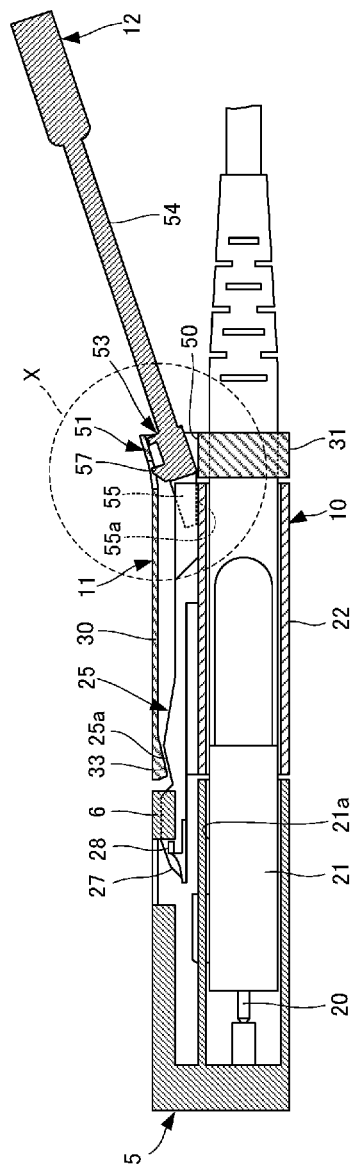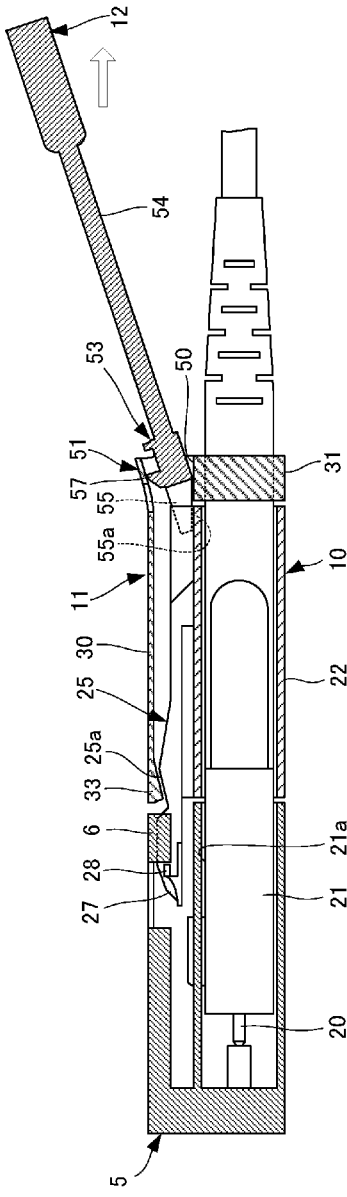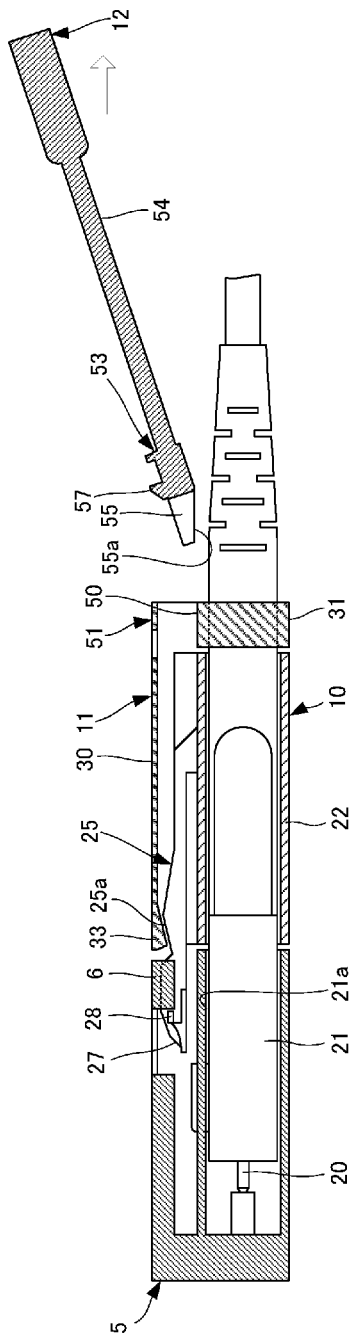

TOOL FOR PLUG, PLUG AND CABLE WITH PLUG

TECHNICAL FIELD

The disclosure relates to a tool for plug, a plug and a cable with plug.

BACKGROUND ART

An optical fiber cable and an optical module such as a receiver and a transmitter or the other optical fiber cable are connected via an adapter (including a so-called receptacle), and a plug to be connected to the adapter is provided at a terminal part of the optical fiber cable. In a communication device on which the optical module is to be mounted or a device such as a distribution frame configured to relay the optical fiber cables, a plurality of adapters is compactly provided from standpoints of miniaturization of the device and the like. Regarding this, a tool for easily connecting and/or extracting a plug to and/or from the adapters compactly provided and a plug with tool have been known.

A plug disclosed in JP-A-2002-350677 has a plug main body to be inserted (connected) to an adapter and a knob moveably supported to the plug main body. When the knob is moved relative to the plug main body inserted (connected) to the adapter in an extraction direction, a connecting state between the adapter and the plug main body is released and the plug main body is pulled out from the adapter. A plug attaching/detaching tool disclosed in JP-A-2002-350677 includes a gripping part, an insertion tool provided at one end portion of the gripping part in a longitudinal direction, and an extraction tool provided at the other end portion.

The insertion tool includes a knob holder configured to surround and hold the knob, and the knob holder is formed with a projection configured to be in contact with a rear end portion of the knob. When the gripping part is inserted with the projection being in contact with the rear end portion of the knob, the plug main body is inserted into the adapter. Also, the extraction tool includes a boot holder configured to surround and hold a boot provided in the vicinity of a rear end of the knob and an engaging projection extending from the boot holder. When the gripping part is pulled with the engaging projection being engaged with the knob, the knob is moved in an extraction direction, so that the insertion state (connecting) between the adapter and the plug main body is released and the plug main body is pulled out from the adapter.

A plug with extraction tool disclosed in JP-A-2005-17602 includes a plug main body to be connected to an adapter and a knob moveably supported to the plug main body. When the knob is moved relative to the plug main body connected to the adapter in the extraction direction, the connecting state between the adapter and the plug main body is released and the plug main body is pulled out from the adapter. The plug with extraction tool disclosed in JP-A-2005-17602 further includes a pull tab.

The pull tab has, at a tip end thereof, a cover part configured to surround and hold the knob and the boot, and a pull part at a rear end. The cover part is formed with an engaging projection configured to engage with the knob. When the pull part is pulled with the engaging projection being engaged to the knob, the knob is moved in the extraction direction, so that the connecting state between the adapter and the plug main body is released and the plug main body is pulled out from the adapter.

SUMMARY

In a plug insertion/extraction tool disclosed in JP-A-2002-350677, an insertion tool and an extraction tool are separately provided. When the plug pulled out from the adapter by using the extraction tool is again inserted into the adapter by using the insertion tool, the extraction tool should be detached from the plug. That is, it is not possible to leave the plug insertion/extraction tool with one of the insertion tool and the extraction tool being attached to the plug.

In order to prevent the detachment of the plug, the insertion tool is configured to surround and hold the knob by the knob holder, and the extraction tool is configured to surround and hold the boot by the boot holder. In this case, however, it is difficult to detach the insertion tool and the extraction tool from the plug. The pull tab of the plug with extraction tool disclosed in JP-A-2005-17602 is also configured to surround and hold the knob and the boot by the cover part, and it is difficult to detach the pull tab from the plug.

The disclosure has been made in view of the above situations, and an object thereof is to provide a tool for plug, which can be used to extract a plug connected to an adapter and can be easily attached and detached to and from the plug, a plug having the tool, and a cable with plug.

According to a tool for plug of the disclosure, the plug comprises a plug main body that to be connected to an adapter and a slider that is supported to the plug main body to be moveable in an extraction direction in which the plug main body is to be pulled out from the adapter, wherein the plug is configured such that, when the slider is moved in the extraction direction, a connecting state between the adapter and the plug main body is released and the plug main body is pulled out from the adapter, the tool comprising: an insertion portion that is to be inserted into a slot formed in the slider in an opposite direction to the extraction direction; and an operation part provided integrally with the insertion portion and extending in the extraction direction from the insertion portion inserted in the slot, wherein the insertion portion comprises: a tapered part having a thickness that gradually decreases toward a tip end of the insertion portion, wherein a first surface is configured as an inclined surface inclined relative to a second surface, the first surface being one surface of both surfaces of the insertion portion in a thickness direction, the second surface being another surface of the both surfaces; and an engaging projection provided on a surface of outer peripheral surfaces of the insertion portion, except for the first surface, wherein when the operation part is pulled in the extraction direction at a state where the second surface of the insertion portion inserted in the slot is disposed in parallel with the extraction direction, the engaging projection is engaged with an engaging portion of the slider and the slider is moved integrally with the insertion portion in the extraction direction, and wherein when the operation part is pulled in the extraction direction at a state where the inclined surface of the insertion portion inserted in the slot is disposed in parallel with the extraction direction, the engaging projection is released from an engaging state with the engaging projection and the tool is detached from the slider.

Further, according to a plug of the disclosure, the plug comprises: a plug main body to be connected to an adapter; and a slider supported to the plug main body to be moveable in an extraction direction in which the plug main body is to be pulled out from the adapter, wherein the plug is configured such that, when the slider is moved in the extraction direction, a connecting state between the adapter and the plug main body is released and the plug main body is pulled out from the adapter, wherein the plug further comprises a tool to be detachably attached to the slider, wherein the tool comprises: an insertion portion that is to be inserted into a slot formed in the slider in an opposite direction to the extraction direction; and an operation part provided integrally with the insertion portion and extending in the extraction direction from the insertion portion inserted in the slot, wherein the insertion portion comprises: a tapered part having a thickness that gradually decreases toward a tip end of the insertion portion, wherein a first surface is configured as an inclined surface inclined relative to a second surface, the first surface being one surface of both surfaces of the insertion portion in a thickness direction, the second surface being another surface of the both side surfaces; and an engaging projection provided on a surface of outer peripheral surfaces of the insertion portion, except for the first surface, wherein when the operation part is pulled in the extraction direction at a state where the second surface of the insertion portion inserted in the slot is disposed in parallel with the extraction direction, the engaging projection is engaged with an engaging portion of the slider and the slider is moved integrally with the tool in the extraction direction, and wherein when the operation part is pulled in the extraction direction at a state where the inclined surface of the insertion portion inserted in the slot is disposed in parallel with the extraction direction, the engaging projection is released from an engaging state with the engaging projection and the tool is detached from the slider.

Further, according to a cable with plug of the disclosure, the plug is attached to a terminal part.

According to the disclosure, it is possible to provide the tool for plug, which can be used to extract the plug connected to the adapter and can be easily attached and detached to and from the plug, the plug having the tool, and the cable with plug.

BRIEF DESCRIPTION OF THE DRAWINGS

FIG. 7A A sectional view depicting operations of the respective parts of the plug when the connecting state between the adapter and the plug is released using the tool for plug.

FIG. 7B A sectional view depicting operations of the respective parts of the plug when the connecting state between the adapter and the plug is released using the tool for plug.

FIG. 7C A sectional view depicting operations of the respective parts of the plug when the connecting state between the adapter and the plug is released using the tool for plug.

FIG. 8A A sectional view depicting operations of the respective parts of the plug when the tool for plug is detached.

FIG. 8B A sectional view depicting operations of the respective parts of the plug when the tool for plug is detached.

FIG. 8C A sectional view depicting operations of the respective parts of the plug when the tool for plug is detached.

DESCRIPTION OF ILLUSTRATIVE EMBODIMENTS

Hereinafter, illustrative embodiments will be described with reference to the drawings.

Figure 1:
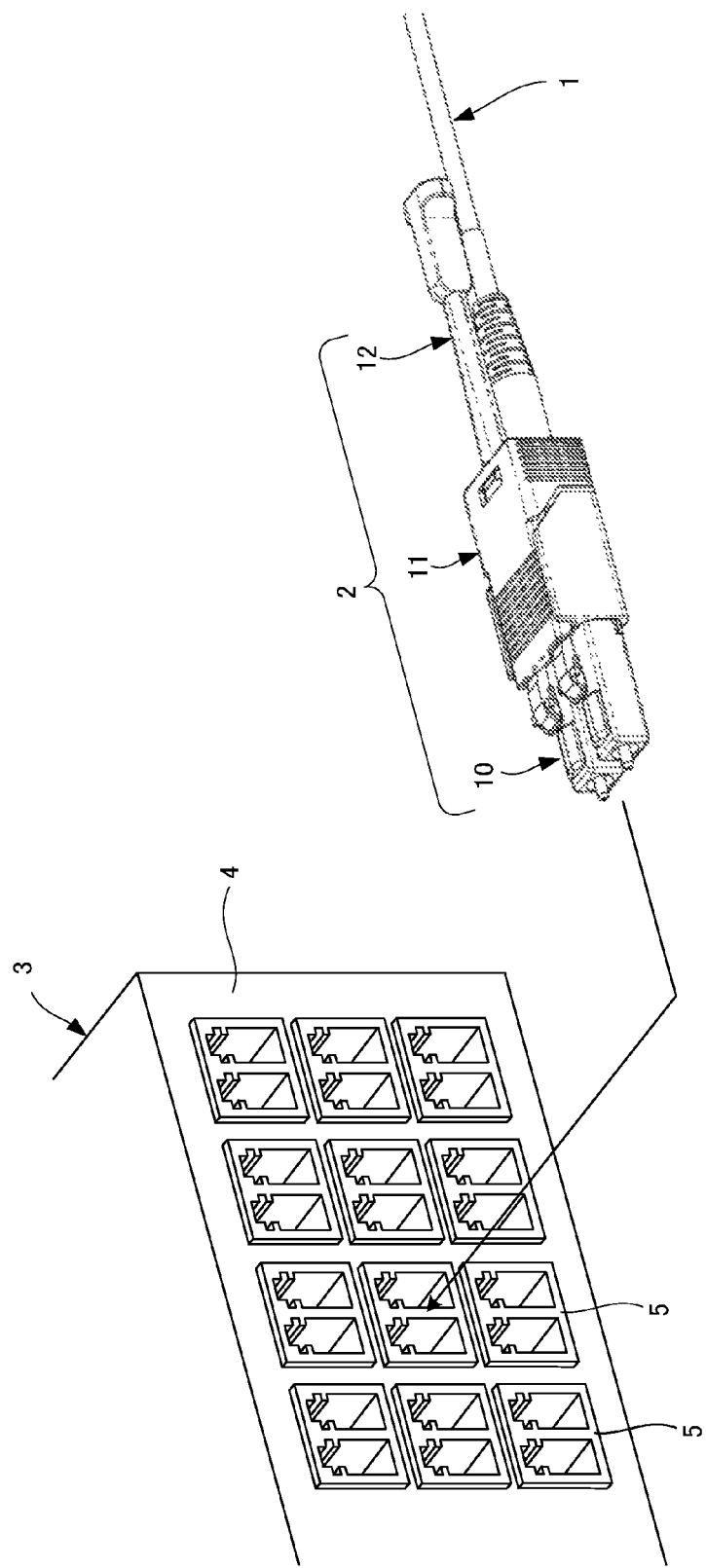
FIG. 1 A perspective view of an example of a cable with plug, depicting an illustrative embodiment of the disclosure.

A cable 1 shown in FIG. 1 is an optical fiber cable. A plug 2 is attached to a terminal part of the optical fiber cable 1. The plug 2 is connected to an adapter 5 provided for a panel 4 of a device 3. The device 3 is a communication device or a distribution frame. The optical fiber cable 1 is connected to an optical module mounted on the communication device or another optical fiber cable accommodated in the distribution frame, via the adapter 5.

The adapter 5 includes an adapter, so-called receptacle of which a connecting hole is provided only at a front surface of the panel 4, and an adapter of which a connecting hole is provided at a front surface and a back surface of the panel 4. The adapter of which the connecting hole is provided only at the front surface of the panel 4 is typically used to connect the optical fiber cable 1 and the optical module, and the adapter of which the connecting hole is provided at the front surface and the back surface of the panel 4 is typically used to connect the optical fiber cable 1 and another optical fiber cable.

Figure 2:
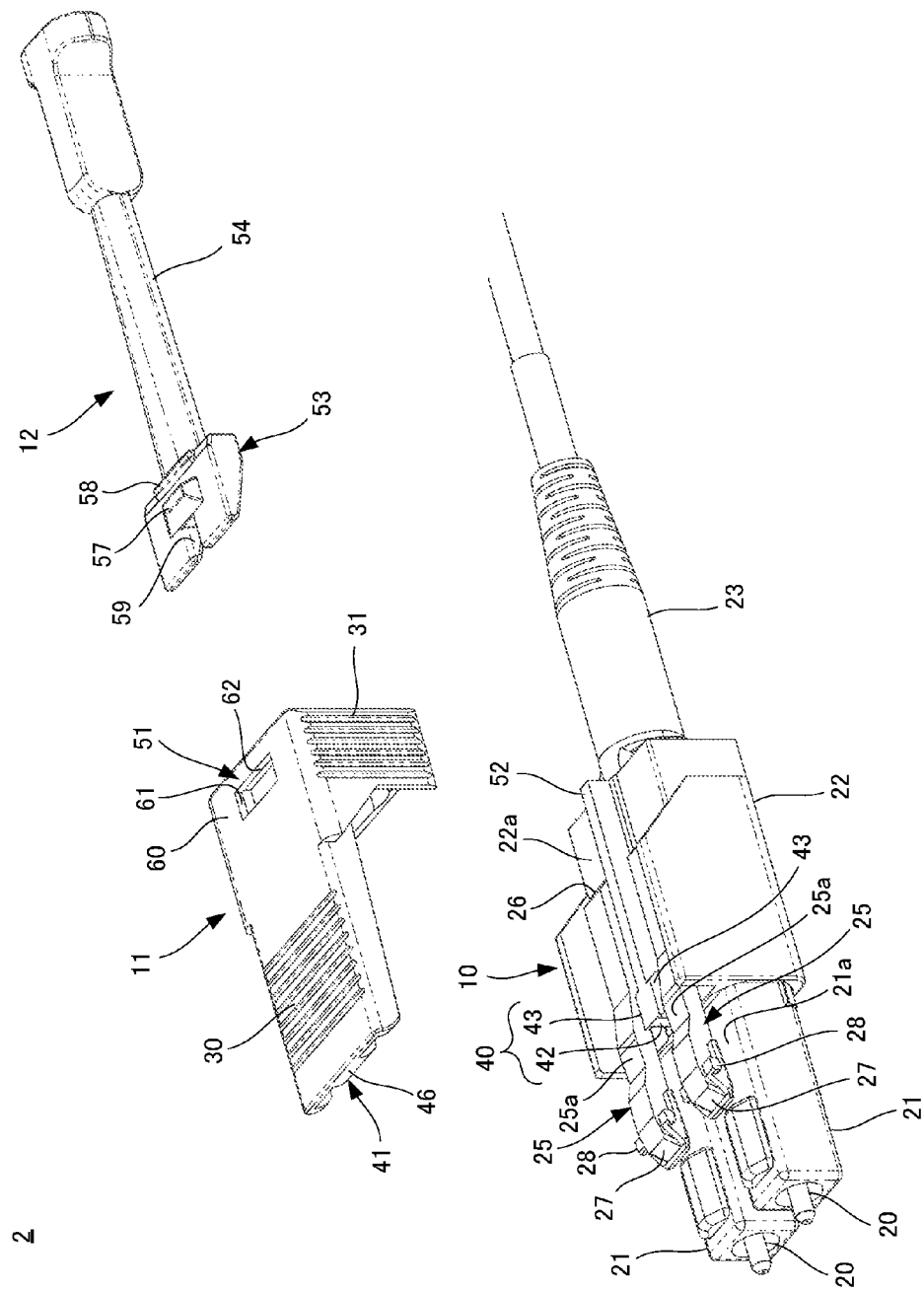
FIG. 2 An exploded perspective view of a plug of FIG. 1.
Figure 3:
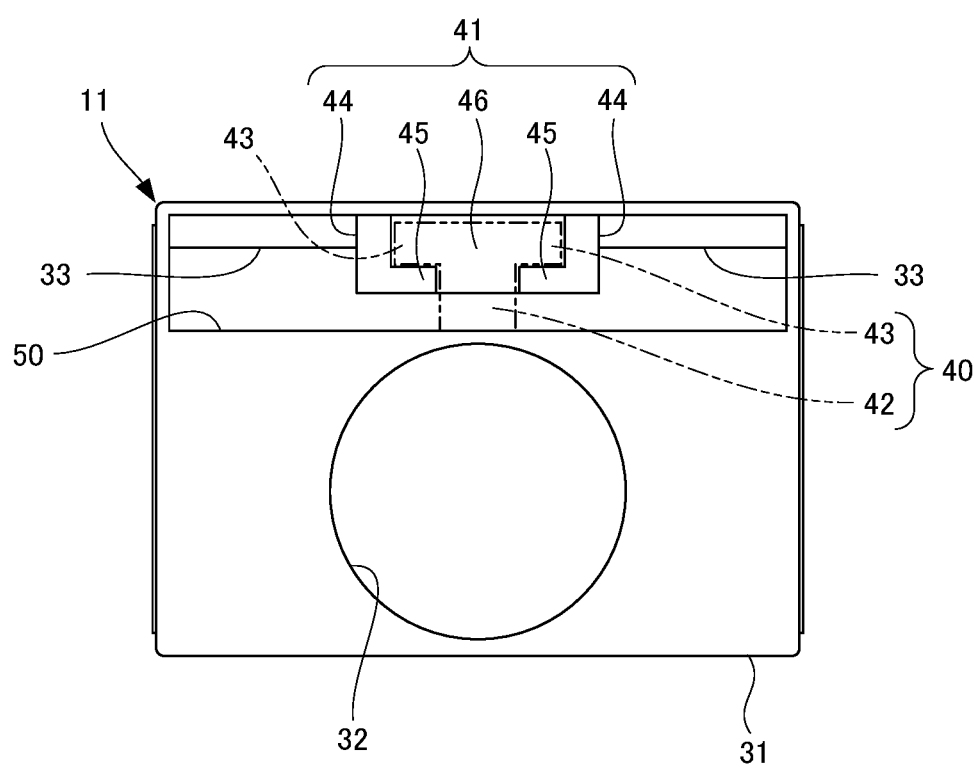
FIG. 3 A rear view of a slider of the plug of FIG. 1.

FIGS. 2 and 3 depict a configuration of the plug 2.

The plug 2 has a plug main body 10, a slider 11, and a tool 12.

The plug main body 10 has ferrules 20 configured to hold terminal parts of core wires (optical wires) of the optical fiber cable 1, plug frames 21 configured to support the ferrules 20, and a latch frame 22 configured to support the plug frames 21. In this example, the ferrule 20 is provided for each core wire, and the plug frame 21 is provided for each ferrule 20. The optical fiber cable 1 may be a single core cable or a multi-core cable having two or more cores, and the numbers of the ferrules 20 and the plug frames 21 are appropriately changed depending on the number of the cores of the optical fiber cable 1. In the meantime, the ferrule 20 may be a multi-core ferrule configured to hold a plurality of core wires.

The latch frame 22 has a tube shape. The optical fiber cable 1 is inserted into the latch frame 22 and is taken out from one axial end-side opening of the latch frame 22. The optical fiber cable 1 taken out from the latch frame 22 is covered with a boot 23 for preventing the cable from bending.

The plug frame 21 is disposed to protrude from the other axial end-side opening of the latch frame 22, and this plug frame 21 is connected to the adapter 5. In the below, a direction in which the plug frame 21 protrudes from the latch frame 22 is referred to as the front of the plug 2, and an opposite direction thereto is referred to as the rear. When the plug main body 10 is pulled rearward, the plug frame 21 is pulled out from the adapter 5.

One surface 22a of an outer periphery of the latch frame 22 is provided with latches 25 that are to be engaged to the adapter 5. In the below, a direction that is perpendicular to a front and back direction in a plane of the outer surface 22a and is parallel with the outer surface 22a is referred to as a width direction of the plug 2. Also, a direction perpendicular to the outer surface 22a is referred to as an upper and lower direction of the plug 2, and the outer surface 22a-side is referred to as an upper side. In the meantime, the two latches 25 are disposed at an interval in the width direction, but one or more latches 25 may be provided.

The latch 25 extends forward from a support part 26 fixed to the outer surface 22a of the latch frame 22, and a front end portion 27 of the latch 25 is disposed above the plug frame 21. Gaps are formed between the latch 25 and the outer surface 22a of the latch frame 22 and an outer surface 21a of the plug frame 21, except for the support part 26. Thereby, when the latch 25 is elastically bent, the front end portion 27 can be displaced from the above of the outer surface 21a of the plug frame 21 toward the outer surface 21a. The front end portion 27 is accommodated in the adapter 5 together with the plug frame 21, and the front end portion 27 is provided with an engaging projection 28 that is to be engaged to the adapter 5.

The slider 11 has a cover part 30 disposed above the latch 25 and a gripping part 31 disposed at the rear of the latch frame 22. The outer surface 22a of the latch frame 22 and the cover part 30 face each other with the latch 25 being interposed therebetween, and the outer surface 22a and the cover part 30 are respectively provided with engaging portions 40, 41 to be engaged with each other. By both the engaging portions 40, 41, the slider 11 is supported to be moveable rearward, in other words, is supported to be moveable in an extraction direction in which the plug frame 21 is to be pulled out from the adapter 5.

The engaging portion 40 of the latch frame 22 is configured by a rib 42 fixed to the outer surface 22a of the latch frame 22 and a pair of wings 43 protruding from an upper end portion of the rib 42 toward both sides in the width direction, has a substantially T-shaped section as a whole, and extends in the front and back direction.

As shown in FIG. 3, the engaging portion 41 of the cover part 30 includes a pair of arms 44 disposed at an interval in the width direction. The pair of arms 44 is configured to sandwich the rib 42 and pair of wings 43 of the engaging portion 40 in the width direction, and the cover part 30 is guided in the front and back direction by engagement of the rib 42, the pair of wings 43 and the pair of arms 44. Each arm 44 is provided with an engaging claw 45, which is accommodated between the outer surface 22a of the latch frame 22 and the wing 43, and the cover part 30 is restrained from rising by engagement of the wing 43 and the engaging claw 45. Thereby, the slider 11 is supported to be moveable in the extraction direction. In the meantime, the gripping part 31 of the slider 11 disposed at the rear of the latch frame 22 is provided with an insertion hole 32 in which the boot 23 is to be inserted, and the slider 11 is auxiliarily supported by engagement of an inner periphery of the insertion hole 32 and the boot 23.

The engaging portion 41 further includes a stopper 46 configured to block a space between front end portions of the pair of arms 44. A moveable region of the slider 11 in the extraction direction is defined by the stopper 46 and the gripping part 31. When the slider 11 is moved in the extraction direction by a predetermined amount, the stopper 46 is contacted to a front end of the rib 42 of the engaging portion 40, so that the movement of the slider 11 in the extraction direction is hindered. Also, when the slider 11 is moved in an opposite direction to the extraction direction by a predetermined amount, the gripping part 31 is contacted to a rear end of the latch frame 22, so that the movement of the slider 11 in the opposite direction to the extraction direction is hindered.

In the meantime, the engaging portion 40 of the latch frame 22 and the engaging portion 41 of the cover part 30 are not limited to the above configurations. For example, the engaging portion 41 of the cover part 30 may be configured by the rib 42 and the pair of wings 43, and the engaging portion 40 of the latch frame 22 may be configured by the pair of arms 44.

The slider 11 supported to be moveable in the extraction direction further includes a pressing part 33 configured to push down the latch 25 in correspondence to the movement in the extraction direction. The pressing part 33 is provided at the cover part 30 configured to position the latch 25 between the cover part and the outer surface 22a of the latch frame 22. The latch 25 is provided with a sliding contact surface 25a inclined so as to be spaced from the outer surface 22a toward the extraction direction. When the slider 11 is moved in the extraction direction, the pressing part 33 is slid in the extraction direction along the sliding contact surface 25a, thereby pressing down the latch 25 toward the outer surface 22a. The pushed-down latch 25 is elastically bent, and the front end portion 27 of the latch 25 is displaced toward the outer surface 21a of the plug frame 21, as described above.

Figure 4A:
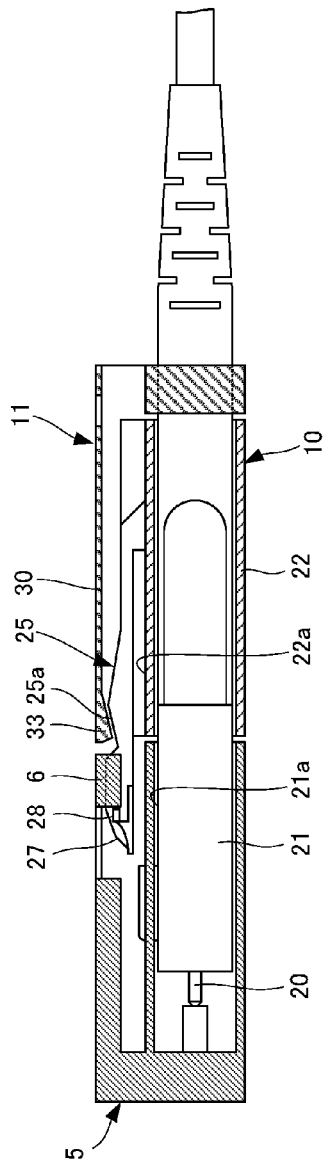
FIG. 4A A sectional view depicting operations of respective parts of the plug when a connecting state between an adapter and the plug is released.
Figure 4B:
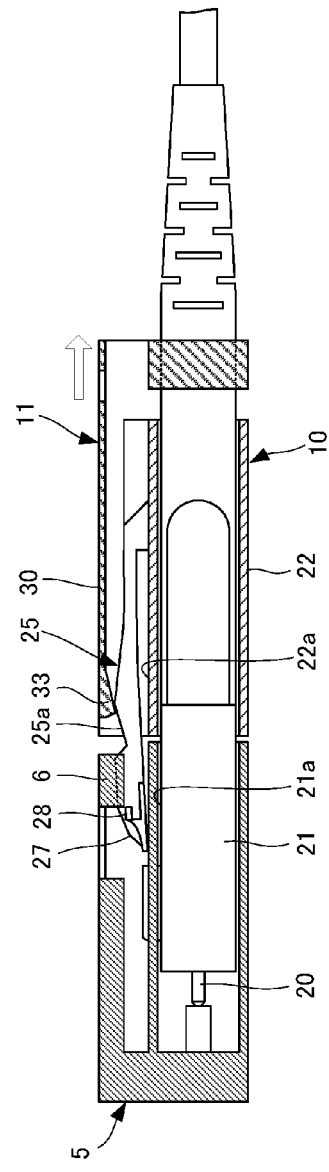
FIG. 4B A sectional view depicting operations of the respective parts of the plug when the connecting state between the adapter and the plug is released.
Figure 4C:
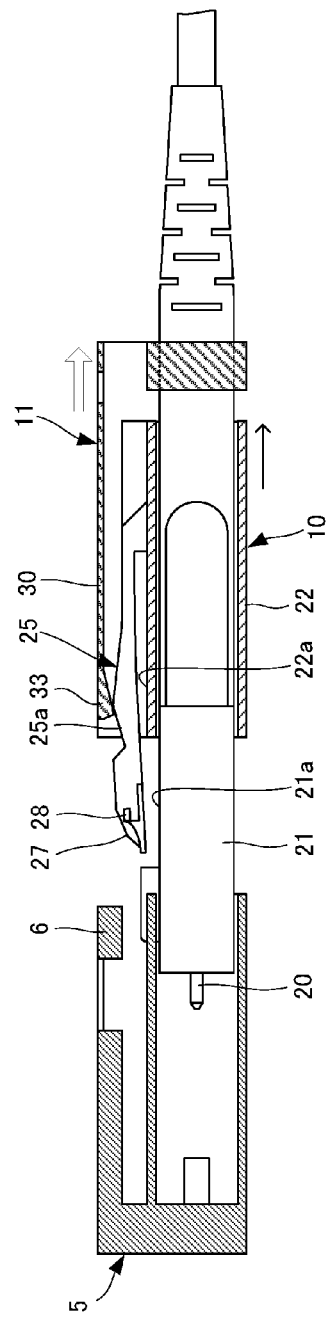
FIG. 4C A sectional view depicting operations of the respective parts of the plug when the connecting state between the adapter and the plug is released.

FIGS. 4A to 4C depict operations of the respective parts of the plug 2 when the connecting state between the adapter 5 and the plug main body 10 is released.

As shown in FIG. 4A, the plug frame 21 of the plug main body 10 is connected to the adapter 5. The front end portion 27 of the latch 25 is also accommodated in the adapter 5, and the engaging projection 28 provided at the front end portion 27 is engaged to an engaging portion 6 of the adapter 5.

As shown in FIG. 4B, when the slider 11 is pulled in the extraction direction, the slider 11 is moved relative to the plug main body 10 fixed to the adapter 5 in the extraction direction, and the pressing part 33 of the slider 11 is slid along the sliding contact surface 25a of the latch 25, thereby pushing down the latch 25. The pushed down latch 25 is elastically bent, and the front end portion 27 of the latch 25 is displaced toward the outer surface 21a of the plug frame 21, as described above. As the front end portion 27 is displaced, the engaging state between the engaging portion 6 of the adapter 5 and the engaging projection 28 of the front end portion 27 is released, so that the connecting state between the adapter 5 and the plug frame 21 can be released.

As shown in FIG. 4C, when the slider 11 is continuously pulled in the extraction direction, the slider 11 reaches one end of the moveable region in the extraction direction, the plug main body 10 is also pulled integrally with the slider 11 in the extraction direction, and the connecting state between the adapter 5 and the plug frame 21 is released, so that the plug frame 21 is pulled out from the adapter 5.

In this way, the slider 11 is moved in the extraction direction, so that the connecting state between the adapter 5 and the plug frame 21 is released and the plug frame 21 is pulled out from the adapter 5.

The tool 12 is used to pull the slider 11 in the extraction direction, thereby extracting the plug main body 10 from the adapter 5. For example, as shown in FIG. 1, when the plurality of adapters 5 is compactly provided for the panel 4 of the device 3, the plurality of optical fiber cables 1 connected to the device 3 is also compactly provided and it is difficult to bring a finger into contact with the slider 11, the slider 11 is pulled in the extraction direction via the tool 12 attached to the slider 11. Also, in this example, the tool 12 is also used to connect the adapter 5 and the plug main body 10 each other.

Referring to FIGS. 2 and 3, the gripping part 31 of the slider 11 is formed with a slot 50 in which the tool 12 is to be inserted. The slot 50 opens on a rear surface of the gripping part 31. The tool 12 is inserted into the slot 50 in the opposite direction to the extraction direction. The slot 50 is provided with an engaging portion 51 to be engaged with the inserted tool 12.

The slot 50 is configured to communicate with the gap between the latch frame 22 of the plug main body 10 and the cover part 30 of the slider 11. The outer surface 22a of the latch frame 22 is provided with a pressure receiving part 52 to which the tool 12 inserted into the slot 50 is contacted. The pressure receiving part 52 is configured by a rib extending in the front and back direction. However, the configuration of the pressure receiving part 52 is not particularly limited.

Figure 5A:
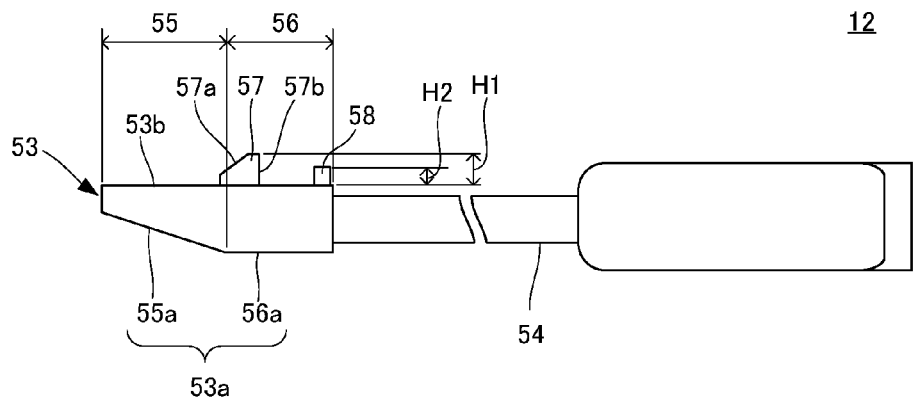
FIG. 5A A side view of a tool for the plug of FIG. 1.
Figure 5B:
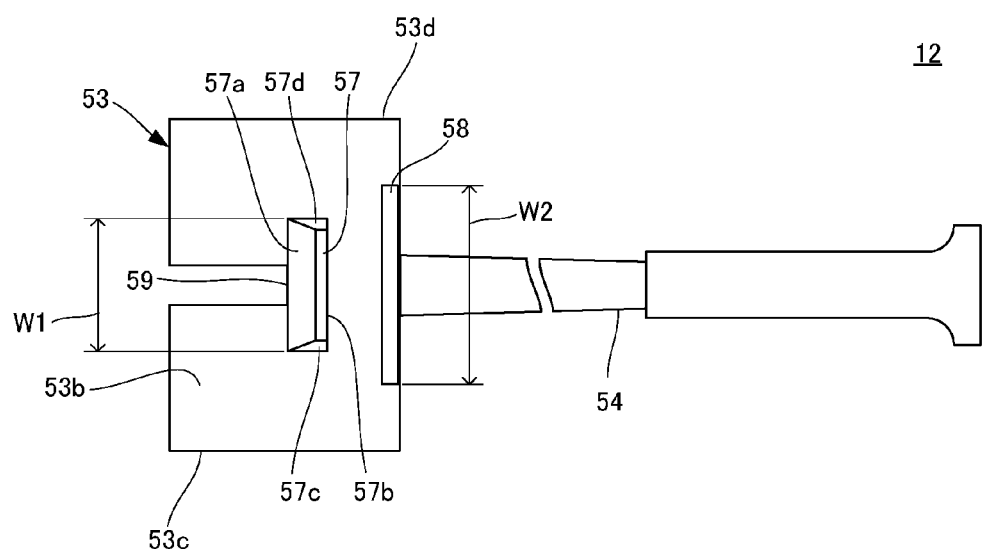
FIG. 5B A plan view of the tool for the plug of FIG. 1.

FIGS. 5A and 5B depict a configuration of the tool 12.

The tool 12 has an insertion portion 53, which is to be inserted into the slot 50 of the slider 11 in the opposite direction to the extraction direction in which the plug main body 10 is to be pulled out from the adapter 5, and an operation part 54 integrated with the insertion portion 53 and extending in the extraction direction from the insertion portion 53 inserted in the slot 50.

The insertion portion 53 has a tapered part 55 of which a thickness gradually decreases toward a tip end of the insertion portion 53, and a base part 56 provided at a side of the tapered part 55 adjacent to the operation part 54. The tapered part 55 has an inclined surface 55a, which is formed on a first surface 53a of both surfaces of the insertion portion 53 in the thickness direction and is inclined relative to a second surface 53b of the other side. The base part 56 has a constant thickness and a surface 56a, which is formed on the first surface 53a of the insertion portion 53 and is parallel with the second surface 53b. The insertion portion 53 is inserted into the slot 50 with the second surface 53b facing toward the upper side of the plug 2.

The insertion portion 53 has also an engaging projection 57, which is to be engaged with the engaging portion 51 of the slider 11, a pressing projection 58, which is to press the engaging portion 51, and a pressing part 59, which is to contact the pressure receiving part 52 of the plug main body 10.

The engaging projection 57 is provided on a surface of the outer peripheral surfaces of the insertion portion 53 (the first surface 53a, the second surface 53b and both side surfaces 53c, 53d in the width direction), except for the first surface 53a on which the inclined surface 55a of the tapered part 55 is provided. In this example, the engaging projection 57 is provided on the second surface 53b.

As shown in FIG. 2, the engaging portion 51 of the slider 11 is provided on an upper wall 60, which faces the second surface 53b of the insertion portion 53 inserted in the slot 50, of surrounding walls of the slot 50. In this example, the engaging portion 51 includes a through-hole 61 formed in the upper wall 60 and an inner wall 62 formed at a side of the through-hole 61 facing toward the slot opening. The engaging projection 57 is accommodated in the through-hole 61 and is engaged with the inner wall 62.

A front surface 57a of the engaging projection 57 positioned at a tip end-side of the insertion portion 53 is a surface that is to contact the engaging portion 51 when the insertion portion 53 is inserted into the slot 50, and is configured as an inclined surface tilted toward the operation part 54 with respect to a direction perpendicular to the second surface 53b of the insertion portion 53. When the insertion portion 53 is inserted into the slot 50, the engaging portion 51 rides over the engaging projection 57. At this time, the front surface 57a is configured as the inclined surface, so that the engaging portion 51 smoothly rides over the engaging projection 57 and the insertion portion 53 can be easily inserted into the slot 50.

On the other hand, a rear surface 57b opposite to the front surface 57a is a surface that is to be engaged with the inner wall 62 of the engaging portion 51 with the insertion portion 53 being inserted into the slot 50, and the rear surface 57b is substantially perpendicular to the second surface 53b. The rear surface 57b may also be disposed on the tapered part 55 of the insertion portion 53. In this example, the rear surface 57b is disposed on the base part 56.

Also, in this example, both side surfaces 57c, 57d of the engaging projection 57 in the width direction of the insertion portion 53 are configured as inclined surfaces of which an interval therebetween gradually decreases toward an apex of the engaging projection 57.

The pressing projection 58 is provided at a position closer to the operation part 54 than the engaging projection 57 on the second surface 53b of the insertion portion 53. A height H2 of the pressing projection 58 from the second surface 53b is lower than a height H1 of the engaging projection 57. At a state where the insertion portion 53 is inserted in the slot 50, the pressing projection 58 is in contact with the engaging portion 51 or is positioned below the engaging portion 51 with a slight gap between the engaging portion 51 and the pressing projection 58. Also, in this example, a length W2 of the pressing projection 58 in the width direction of the insertion portion 53 is greater than a length W1 of the engaging projection 57, and the pressing projection 58 further extends toward both sides in the width direction of the insertion portion 53 than the engaging projection 57.

The pressing part 59 is provided at a tip end portion of the insertion portion 53, and is contacted to the pressure receiving part 52 of the plug main body 10 when the insertion portion 53 is inserted in the slot 50. The pressing part 59 may be configured by a tip end face of the insertion portion 53 but is configured by a notched part capable of accommodating therein the pressure receiving part 52. Thereby, the pressing part 59 accommodates therein the pressure receiving part 52, so that it functions as a guide when the insertion portion 53 is inserted into the slot 50.

Figure 6A:
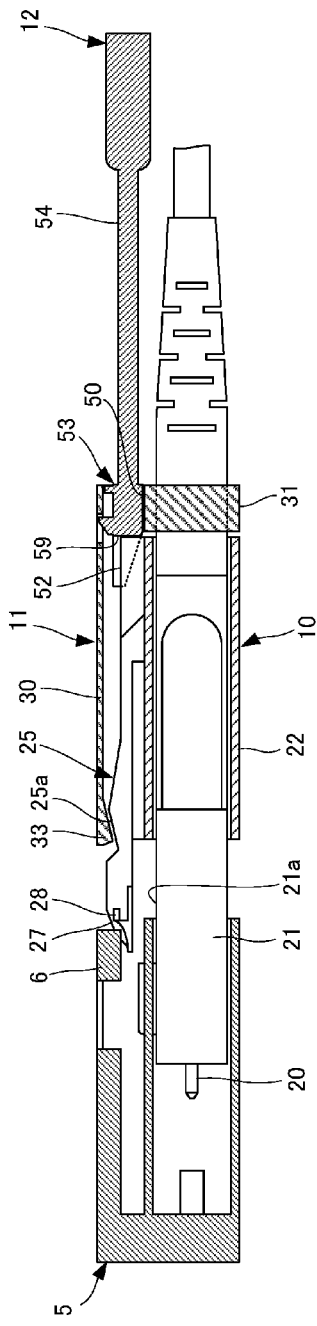
FIG. 6A A sectional view depicting operations of the respective parts of the plug when the adapter and the plug are connected using the tool for plug.
Figure 6B:
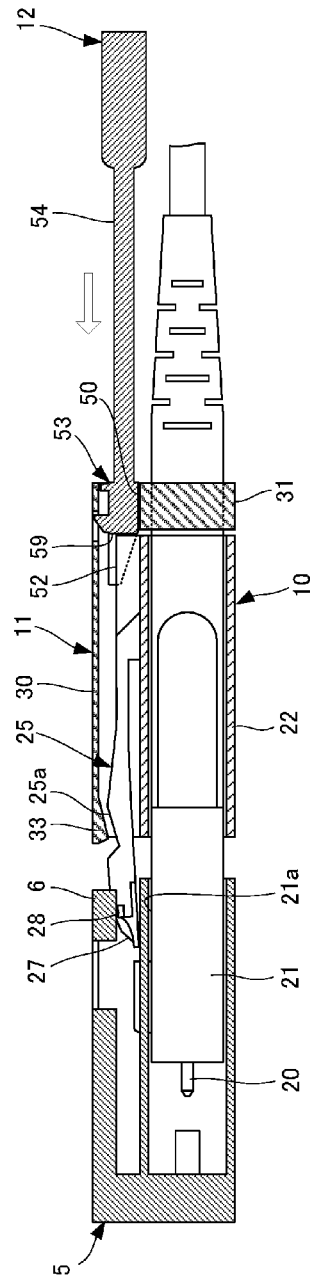
FIG. 6B A sectional view depicting operations of the respective parts of the plug when the adapter and the plug are connected using the tool for plug.
Figure 6C:
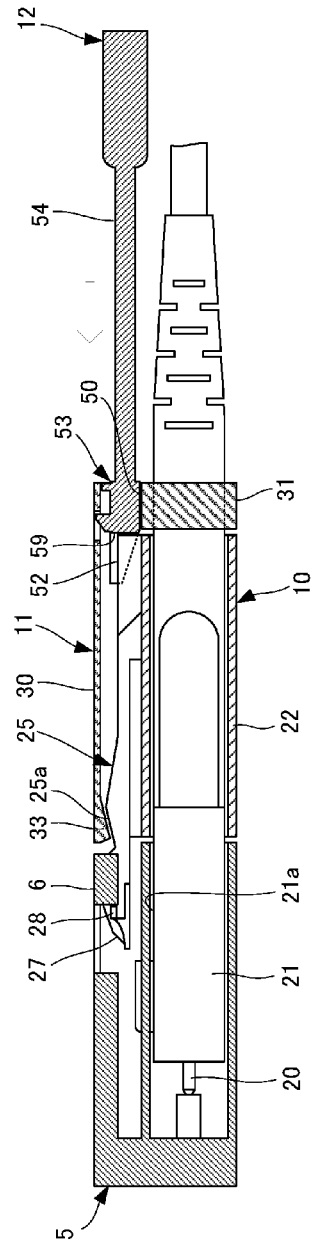
FIG. 6C A sectional view depicting operations of the respective parts of the plug when the adapter and the plug are connected using the tool for plug.

FIGS. 6A to 6C depict operations of the respective parts of the plug 2 when the adapter 5 and the plug 2 are connected using the tool 12.

As shown in FIG. 6A, the insertion portion 53 of the tool 12 is inserted in the slot 50 of the slider 11, and the pressing part 59 of the insertion portion 53 is in contact with the pressure receiving part 52 of the plug main body 10.

As shown in FIG. 6B, when the operation part 54 of the tool 12 is pushed in a connecting direction in which the plug main body 10 is to be connected to the adapter 5, the plug main body 10 is also pushed via the pressing part 59 and the pressure receiving part 52, so that the plug main body 10 is moved in the connecting direction. As the plug main body 10 is moved, the plug frame 21 of the plug main body 10 and the front end portion 27 of the latch 25 are inserted into the adapter 5.

As shown in FIG. 6C, when the plug main body 10 is moved in the connecting direction until the adapter 5 and the plug frame 21 are connected, the engaging portion 6 of the adapter 5 rides over the engaging projection 28 of the latch 25, so that the engaging projection 28 is engaged with the engaging portion 6.

In the meantime, the tool 12 may be configured to press the slider 11, instead of the plug main body 10. However, the tool 12 is preferably configured to directly press the plug main body 10 that is to be connected to the adapter 5. In the configuration where the plug main body 10 is directly pressed, the operation sense is improved, as compared to a configuration where the slider 11 supported to the plug main body 10 to be moveable in the extraction direction and the connecting direction opposite to the extraction direction is pressed.

FIGS. 7A to 7C depict operations of the respective parts of the plug 2 when the connecting state between the adapter 5 and the plug 2 is released using the tool 12.

As shown in FIG. 7A, the plug frame 21 of the plug main body 10 is connected to the adapter 5. The front end portion 27 of the latch 25 is also accommodated in the adapter 5, and the engaging projection 28 provided at the front end portion 27 is engaged with the engaging portion 6 of the adapter 5. The insertion portion 53 of the tool 12 is inserted in the slot 50 of the slider 11. When the connecting state between the adapter 5 and the plug frame 21 is released using the tool 12, the second surface 53b of the insertion portion 53 is disposed in parallel with the extraction direction of the plug main body 10. In the meantime, even when the second surface 53b is slightly inclined (for example, −5° to +5°) relative to the extraction direction, the second surface 53b and the extraction direction are considered to be parallel.

As shown in FIG. 7B, at a state where the second surface 53b of the insertion portion 53 is disposed in parallel with the extraction direction of the plug main body 10, when the operation part 54 of the tool 12 is pulled in the extraction direction of the plug main body 10, the engaging projection 57 of the insertion portion 53 is engaged with the engaging portion 51 of the slider 11, so that the slider 11 engaged with the engaging projection 57 is also pulled in the extraction direction. The slider 11 pulled in the extraction direction is moved relative to the plug main body 10 fixed to the adapter 5 in the extraction direction, and the pressing part 33 of the slider 11 pushes down the latch 25. The front end portion 27 of the pushed-down latch 25 is displaced toward the outer surface 21a of the plug frame 21. As the front end portion 27 is displaced, the engaging state between the engaging portion of the adapter 5 and the engaging projection 28 of the front end portion 27 is released, so that the connecting state between the adapter 5 and the plug frame 21 can be released.

As shown in FIG. 7C, when the tool 12 is continuously pulled in the extraction direction, the slider 11 reaches one end of the moveable region in the extraction direction, the plug main body 10 is also pulled integrally with the slider 11 in the extraction direction, and the connecting state between the adapter 5 and the plug frame 21 is released, so that the plug frame 21 is pulled out from the adapter 5.

FIGS. 8A to 8C depict operations of the respective parts of the plug 2 when the tool 12 is detached.

As shown in FIG. 8A, the insertion portion 53 of the tool 12 is inserted in the slot 50 of the slider 11. When detaching the tool 12 from the slider 11, the operation part 54 of the tool 12 is lifted, and the inclined surface 55a of the tapered part 55 of the insertion portion 53 is disposed in parallel with the extraction direction of the plug main body 10. In the meantime, even when the inclined surface 55a is slightly inclined (for example, −5° to +5°) relative to the extraction direction, the inclined surface 55a and the extraction direction are considered to be parallel.

As shown in FIGS. 8B and 8C, at a state where the inclined surface 55a of the tapered part 55 is disposed in parallel with the extraction direction of the plug main body 10, when the operation part 54 of the tool 12 is pulled in the extraction direction of the plug main body 10, the engaging projection 57 of the insertion portion 53 is released from the engaging state with the engaging portion 51 of the slider 11, so that the tool 12 is detached from the slider 11.

In the example of FIGS. 8A to 8C, the plug main body 10 is connected to the adapter 5. However, also in a case where the plug main body 10 is pulled out from the adapter 5, the operations of the respective parts of the plug 2 are the same.

Figure 9:
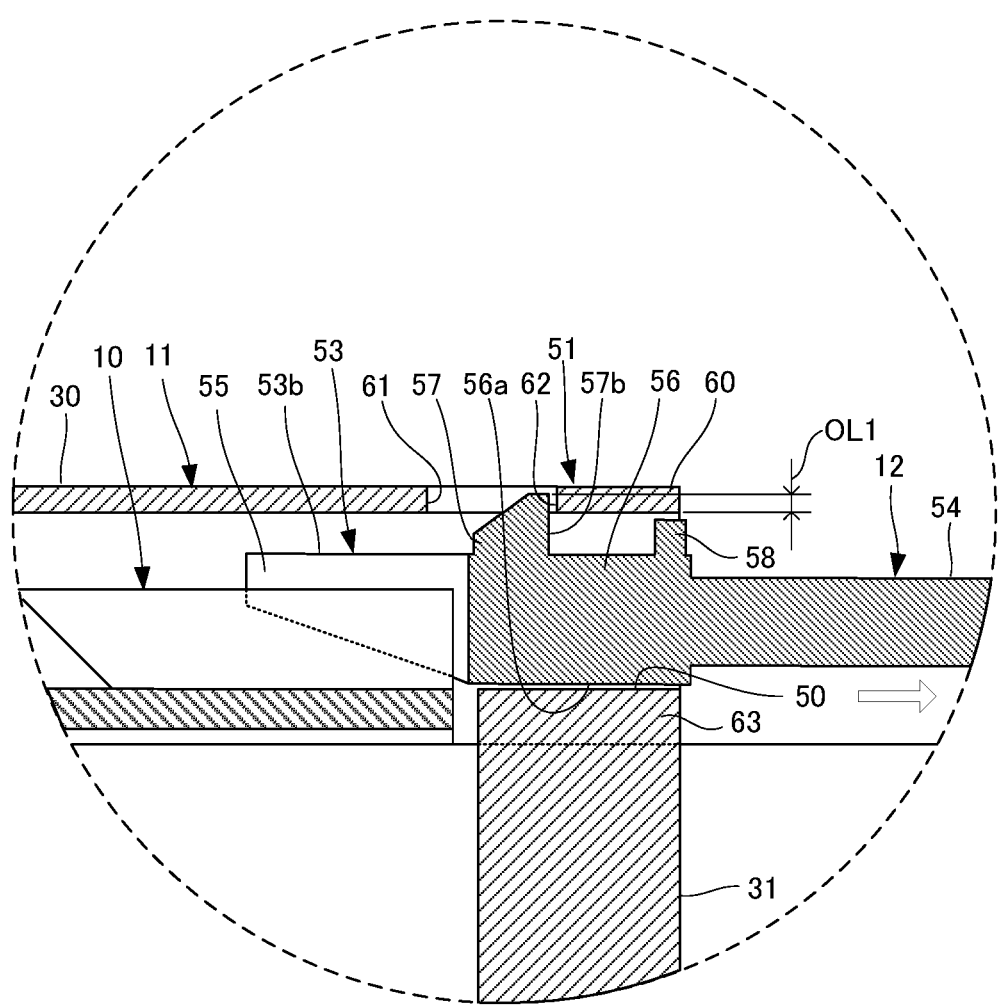
FIG. 9 An enlarged view of a part surrounded with a broken line circle IX of FIG. 7A.
Figure 10:
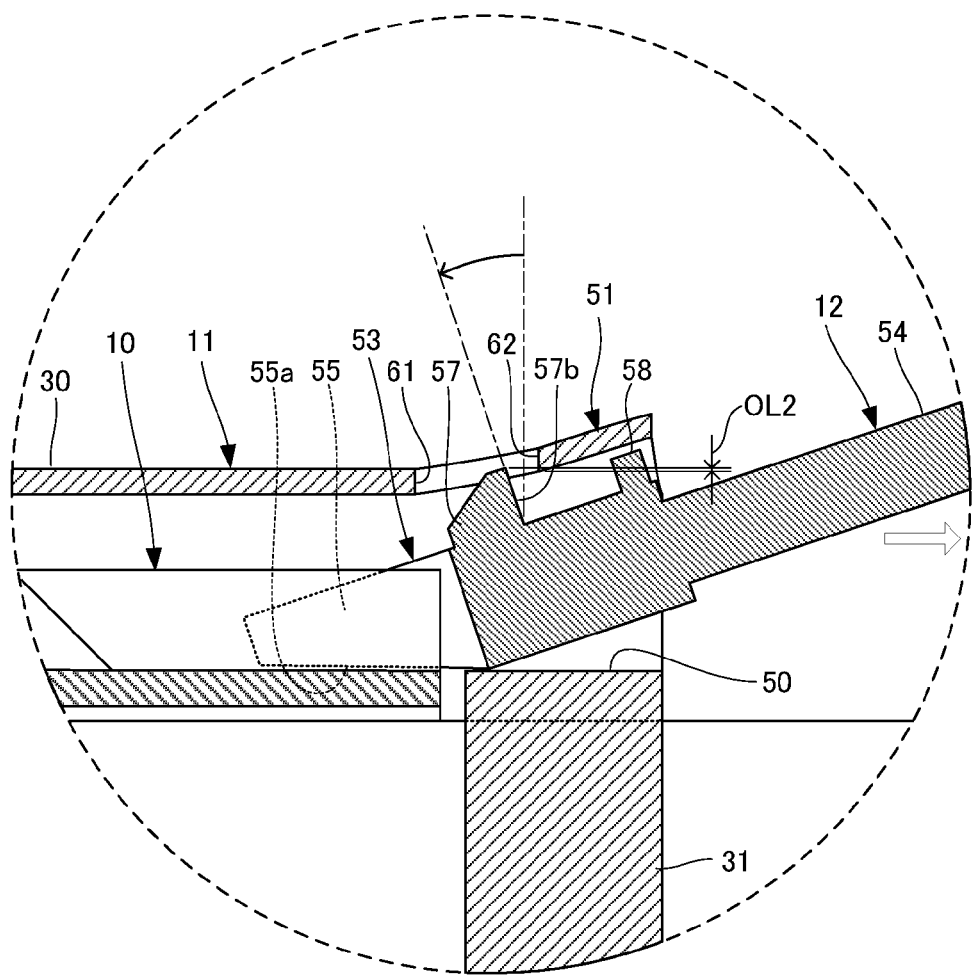
FIG. 10 An enlarged view of a part surrounded with a broken line circle X of FIG. 8A.

FIGS. 9 and 10 depict in detail an engaging relation between the engaging projection 57 of the insertion portion 53 of the tool 12 and the engaging portion 51 of the slider 11. FIG. 9 depicts the engaging relation when the second surface 53b of the insertion portion 53 is disposed in parallel with the extraction direction, and FIG. 10 depicts the engaging relation when the inclined surface 55a of the tapered part 55 of the insertion portion 53 is disposed in parallel with the extraction direction.

As shown in FIG. 9, when the second surface 53b of the insertion portion 53 is disposed in parallel with the extraction direction of the plug main body 10, since the rear surface 57b of the engaging projection 57 is substantially perpendicular to the second surface 53b, the rear surface 57b and the inner wall 62 of the engaging portion 51 face each other in the extraction direction. In this case, when the tool 12 is pulled in the extraction direction of the plug main body 10, as shown in FIGS. 7B and 7C, the engaging projection 57 is engaged with the inner wall 62, and the slider 11 engaged to the engaging projection 57 is pulled integrally with the tool 12 in the extraction direction.

In the meantime, as shown in FIG. 10, when the inclined surface 55a of the tapered part 55 of the insertion portion 53 is disposed in parallel with the extraction direction, the rear surface 57b of the engaging projection 57 is tilted in the opposite side to the inner wall 62 of the engaging portion 51, so that an engaging force between the rear surface 57b and the inner wall 62 is reduced, as compared to the case where the rear surface 57b and the inner wall 62 face each other in the extraction direction. In this case, when the tool 12 is pulled in the extraction direction of the plug main body 10, as shown in FIGS. 8B and 8C, the engaging portion 51 easily rides over the engaging projection 57, so that the engaging projection 57 is easily released from the engaging state with the engaging portion 51. Thereby, the tool 12 is easily detached from the slider 11.

The insertion portion 53 may be entirely configured by the tapered part 55. However, in this example, the insertion portion 53 has the base part 56 provided at the side of the tapered part 55 adjacent to the operation part 54, and the base part 56 has the constant thickness and the surface 56a, which is formed on the first surface 53a of the insertion portion 53 and is parallel with the second surface 53b, as described above. When the second surface 53b of the insertion portion 53 is disposed in parallel with the extraction direction of the plug main body 10, the base part 56 positioned between the upper wall 60 and the lower wall 63 of the slot 50 is surface-contacted to the lower wall 63 by the surface 56a, and the insertion portion 53 is stably supported. Thereby, it is possible to stably hold the insertion portion 53 in the slot 50 with the second surface 53b being disposed in parallel with the extraction direction of the plug main body 10, and to suppress the tool 12 from being abruptly separated from the slider 11.

Also, in this example, the rear surface 57b of the engaging projection 57 is positioned on the base part 56. At the state where the second surface 53b of the insertion portion 53 is disposed in parallel with the extraction direction of the plug main body 10, there occurs no gap between the insertion portion 53 and the lower wall 63 of the slot 50 below the rear surface 57b. Thus, even when the rear surface 57b is applied with a force by the engaging between the rear surface 57b and the inner wall 62, the inclination of the insertion portion 53 that the rear surface 57b is tilted toward to an opposite side to the inner wall 62 is suppressed. Thereby, it is possible to stably hold the insertion portion 53 in the slot 50 with the second surface 53b being disposed in parallel with the extraction direction of the plug main body 10, and to further suppress the tool 12 from being abruptly separated from the slider 11.

Also, in this example, the insertion portion 53 has the pressing projection 58, and the pressing projection 58 is in contact with the engaging portion 51 or is disposed below the engaging portion 51 with a gap from the engaging portion 51 at the state where the insertion portion 53 is inserted in the slot 50, as described above. As shown in FIG. 10, when the inclined surface 55a of the tapered part 55 of the insertion portion 53 is disposed in parallel with the extraction direction, the engaging portion 51 is elastically bent and pushed up by the pressing projection 58. As the engaging portion 51 is pushed up, an engaging margin OL2 between the rear surface 57b of the engaging projection 57 and the inner wall 62 is reduced, as compared to an engaging margin OL1 when the second surface 53b of the insertion portion 53 is disposed in parallel with the extraction direction of the plug main body 10. Thereby, the engaging force between the rear surface 57b and the inner wall 62 is further weakened, so that the tool 12 can be easily detached from the slider 11.

Preferably, as shown in FIG. 5B, the length W2 of the pressing projection 58 in the width direction of the insertion portion 53 is greater than the length W1 of the engaging projection 57, and the pressing projection 58 further extends toward both sides in the width direction of the insertion portion 53 than the engaging projection 57. Thereby, it is possible to push up the engaging portion 51 over an entire engaging range between the rear surface 57b of the engaging projection 57 and the inner wall 62 and to further weaken the engaging force between the rear surface 57b and the inner wall 62, so that it is possible to easily detach the tool 12 from the slider 11.

In the meantime, the inner wall 62 of the engaging portion 51 may be formed by a concave portion formed in the upper wall 60 of the slot 50. However, preferably, like this example, the through-hole 61 is formed, so that the inner wall 62 is formed. By the through-hole 61, the restraint between the engaging portion 51 and the other part of the upper wall 60 except for the engaging portion 51 is weakened, so that the engaging portion 51 can be easily elastically deformed and the tool 12 can be thus easily detached from the slider 11.

Figure 11:
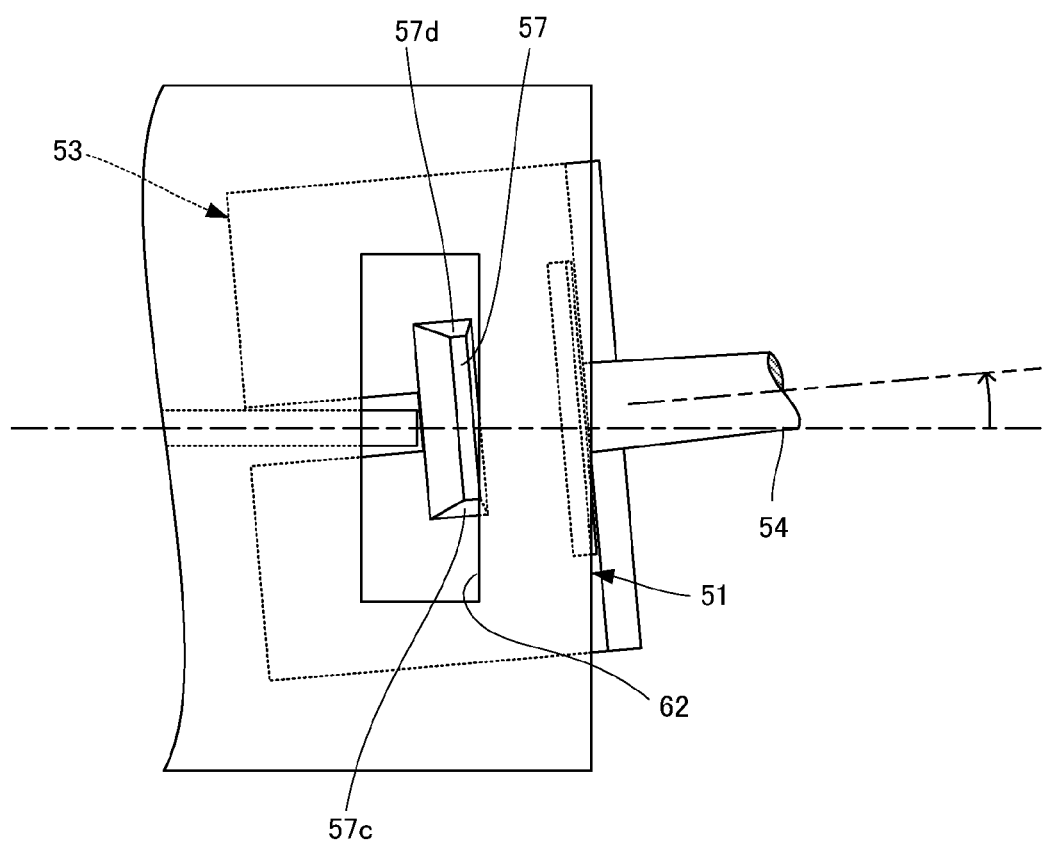
FIG. 11 is a plan view depicting another example of the operation of the tool for plug when the tool for plug is detached.

Also, in this example, both side surfaces 57c, 57d of the engaging projection 57 in the width direction of the insertion portion 53 are configured as inclined surfaces of which an interval therebetween gradually decreases toward an apex of the engaging projection 57. In this case, as shown in FIG. 11, when the tool 12 is detached from the slider 11, the operation part 54 of the tool 12 may be shaken in the width direction of the insertion portion 53. The operation part 54 is shaken, so that a lower part of one side surface 57c (or the side surface 57d) of the engaging projection 57 enters into the below of the inner wall 62, and the engaging portion 51 is lifted by the side surface 57c and easily rides over the engaging projection 57. Thereby, it is possible to further easily detach the tool 12 from the slider 11.

Figure 12A:
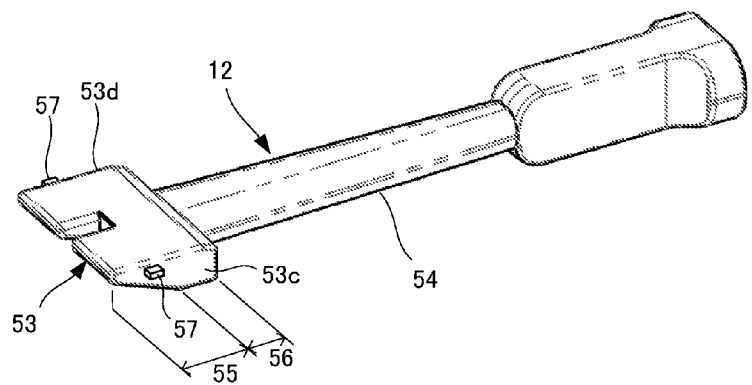
FIG. 12A is a perspective view of another example of the tool for plug.
Figure 12B:
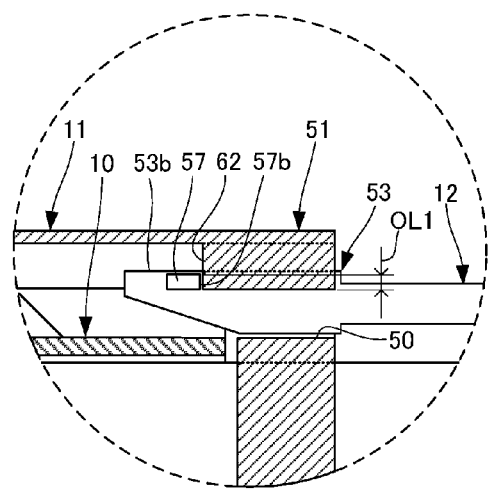
FIG. 12B is an enlarged view of a main part of the plug having the tool for plug shown in FIG. 12A.
Figure 12C:
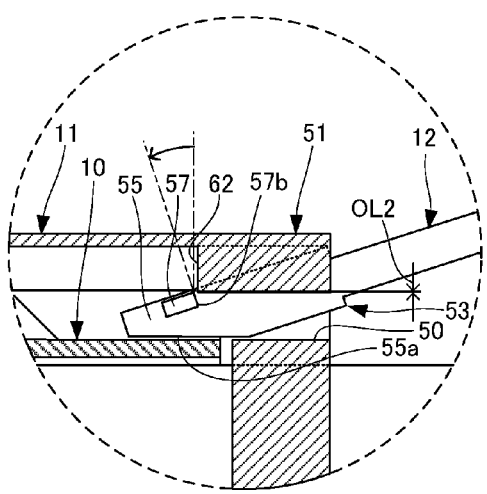
FIG. 12C is an enlarged view of the main part of the plug having the tool for plug shown in FIG. 12A.

FIGS. 12A to 12C depict a modified embodiment of the plug 2.

In the example of FIGS. 12A to 12C, the engaging projection 57 of the tool 12 is provided on both the side surfaces 53c, 53d of the insertion portion 53 in the width direction, and the engaging portion 51 of the slider 11 is provided at sidewalls, which face the side surfaces 53c, 53d of the insertion portion 53 inserted in the slot 50, of the surrounding walls of the slot 50. Also, the rear surface 57b of the engaging projection 57 is disposed on the tapered part 55 of the insertion portion 53.

As shown in FIG. 12B, when the second surface 53b of the insertion portion 53 is disposed in parallel with the extraction direction of the plug main body 10, the rear surface 57b of the engaging projection 57 is substantially perpendicular to the second surface 53b, and the rear surface 57b and the inner wall 62 of the engaging portion 51 face each other in the extraction direction. In this case, when the tool 12 is pulled in the extraction direction of the plug main body 10, the engaging projection 57 is engaged with the inner wall 62, and the slider 11 engaged with the engaging projection 57 is pulled integrally with the tool 12 in the extraction direction.

In the meantime, as shown in FIG. 12C, when the inclined surface 55a of the tapered part 55 of the insertion portion 53 is disposed in parallel with the extraction direction, the rear surface 57b of the engaging projection 57 is tilted toward the opposite side to the inner wall 62 of the engaging portion 51, so that the engaging force between the rear surface 57b and the inner wall 62 is reduced, as compared to the case where the rear surface 57b and the inner wall 62 face each other in the extraction direction. In this case, when the tool 12 is pulled in the extraction direction of the plug main body 10, the engaging portion 51 easily rides over the engaging projection 57, so that the engaging projection 57 is easily released from the engaging state with the engaging portion 51. Thereby, the tool 12 is easily detached from the slider 11.

Also, in this example, the rear surface 57b of the engaging projection 57 is disposed on the tapered part 55, and the engaging projection 57 is displaced downward when the inclined surface 55a of the tapered part 55 of the insertion portion 53 is disposed in parallel with the extraction direction. As the engaging projection 57 is displaced downward, the engaging margin OL2 between the rear surface 57b of the engaging projection 57 and the inner wall 62 is reduced, as compared to the engaging margin OL1 when the second surface 53b of the insertion portion 53 is disposed in parallel with the extraction direction of the plug main body 10. Thereby, the engaging force between the rear surface 57b and the inner wall 62 is further weakened, so that the tool 12 can be easily detached from the slider 11.

Although the illustrative embodiments have been described with reference to the optical fiber cable 1 and the plug 2 attached to the terminal part thereof, the illustrative embodiments are just exemplary and can be changed without departing from the gist of the disclosure. For example, the cable may be an electric cable (for example, a LAN (Local Area Network) cable or the like) in which a conductor is used for the core wire. Also, the cable includes a branch cable in which a plurality of branch wires extends from a main wire. When the branch cable is used, the cable terminal part to which the plug is attached includes a terminal part of the main wire and/or a terminal part of each branch wire.

The invention claimed is:

1. A tool for plug, the plug comprising a plug main body that to be connected to an adapter and a slider that is supported to the plug main body to be moveable in an extraction direction in which the plug main body is to be pulled out from the adapter, wherein the plug is configured such that, when the slider is moved in the extraction direction, a connecting state between the adapter and the plug main body is released and the plug main body is pulled out from the adapter, the tool comprising:
an insertion portion that is to be inserted into a slot formed in the slider in an opposite direction to the extraction direction; and
an operation part provided integrally with the insertion portion and extending in the extraction direction from the insertion portion inserted in the slot,
wherein the insertion portion comprises:
a tapered part having a thickness that gradually decreases toward a tip end of the insertion portion, wherein a first surface is configured as an inclined surface inclined relative to a second surface, the first surface being one surface of both surfaces of the insertion portion in a thickness direction, the second surface being another surface of the both surfaces; and
an engaging projection provided on a surface of outer peripheral surfaces of the insertion portion, except for the first surface,
wherein when the operation part is pulled in the extraction direction at a state where the second surface of the insertion portion inserted in the slot is disposed in parallel with the extraction direction, the engaging projection is engaged with an engaging portion of the slider and the slider is moved integrally with the insertion portion in the extraction direction, and
wherein when the operation part is pulled in the extraction direction at a state where the inclined surface of the insertion portion inserted in the slot is disposed in parallel with the extraction direction, the engaging projection is released from an engaging state with the engaging portion and the tool is detached from the slider.

2. The tool for plug according to claim 1,
wherein the insertion portion has a base part, the base part being provided at a side of the insertion portion closer to the operation part than the tapered part and having a constant thickness.

3. The tool for plug according to claim 2,
wherein the engaging projection has an engaging surface to be engaged with the engaging portion, the engaging surface being disposed on the base part.

4. The tool for plug according to claim 1,
wherein the engaging projection is provided on the second surface of the insertion portion.

5. The tool for plug according to claim 4,
wherein the insertion portion further comprises a pressing projection on the second surface, the pressing projection being provided at a side of the insertion portion closer to the operation part than the engaging projection, and
wherein the pressing projection pushes up the engaging portion when the inclined surface of the insertion portion inserted in the slot is disposed in parallel with the extraction direction.

6. The tool for plug according to claim 4,
wherein both side surfaces of the engaging projection in a width direction of the insertion portion are configured as inclined surfaces, an interval therebetween gradually decreases toward an apex of the engaging projection.

7. The tool for plug according to claim 1,
wherein the insertion portion further comprises a pressing part configured to press the plug main body or the slider in a connecting direction in which the plug main body is to be connected to the adapter.

8. A plug comprising:
a plug main body to be connected to an adapter; and
a slider supported to the plug main body to be moveable in an extraction direction in which the plug main body is to be pulled out from the adapter,
wherein the plug is configured such that, when the slider is moved in the extraction direction, a connecting state between the adapter and the plug main body is released and the plug main body is pulled out from the adapter,
wherein the plug further comprises a tool to be detachably attached to the slider,
wherein the tool comprises:
an insertion portion that is to be inserted into a slot formed in the slider in an opposite direction to the extraction direction; and
an operation part provided integrally with the insertion portion and extending in the extraction direction from the insertion portion inserted in the slot,
wherein the insertion portion comprises:
a tapered part having a thickness that gradually decreases toward a tip end of the insertion portion, wherein a first surface is configured as an inclined surface inclined relative to a second surface, the first surface being one surface of both surfaces of the insertion portion in a thickness direction, the second surface being another surface of the both side surfaces; and
an engaging projection provided on a surface of outer peripheral surfaces of the insertion portion, except for the first surface,
wherein when the operation part is pulled in the extraction direction at a state where the second surface of the insertion portion inserted in the slot is disposed in parallel with the extraction direction, the engaging projection is engaged with an engaging portion of the slider and the slider is moved integrally with the tool in the extraction direction, and wherein when the operation part is pulled in the extraction direction at a state where the inclined surface of the insertion portion inserted in the slot is disposed in parallel with the extraction direction, the engaging projection is released from an engaging state with the engaging portion and the tool is detached from the slider.

9. A cable with plug, in which the plug according to claim 8 is attached to a terminal part of the cable.

* * * * *